United States Patent
Taden et al.

(10) Patent No.: US 10,336,855 B2
(45) Date of Patent: Jul. 2, 2019

(54) AQUEOUS PEPTIDE-FUNCTIONALIZED POLYURETHANE DISPERSIONS

(71) Applicants: Henkel AG & Co. KGaA, Duesseldorf (DE); Max-Planck-Gesellschaft Zur Förderung Der Wissenschaften E.V., Munich (DE)

(72) Inventors: Andreas Taden, Duesseldorf (DE); Katharina Landfester, Mainz (DE); Roland Breves, Mettmann (DE); Hans G. Börner, Berlin (DE); Laura Breucker, Köln (DE); Christian Kastner, Duesseldorf (DE); Birgit Veith, Duesseldorf (DE); Maria Meissler, Berlin (DE); Hannes Keller, Duesseldorf (DE)

(73) Assignees: Henkel AG & Co. KGaA, Duesseldorf (DE); Max-Planck-Gesellschaft Zur Foerderung Der Wissenschaften E.V., Munich (DE)

( * ) Notice: Subject to any disclaimer, the term of this patent is extended or adjusted under 35 U.S.C. 154(b) by 144 days.

(21) Appl. No.: 15/686,437

(22) Filed: Aug. 25, 2017

(65) Prior Publication Data
US 2018/0037694 A1 Feb. 8, 2018

Related U.S. Application Data

(63) Continuation of application No. PCT/EP2016/053804, filed on Feb. 24, 2016.

(30) Foreign Application Priority Data

Feb. 25, 2015 (EP) .................... 15156504

(51) Int. Cl.
| | | |
|---|---|---|
| C08G 18/08 | (2006.01) |
| C08G 18/12 | (2006.01) |
| C08G 18/38 | (2006.01) |
| C08G 18/40 | (2006.01) |
| C08G 18/42 | (2006.01) |
| C08G 18/48 | (2006.01) |
| C08G 18/64 | (2006.01) |
| C08G 18/66 | (2006.01) |
| C08G 18/75 | (2006.01) |
| C09D 175/04 | (2006.01) |
| C09D 175/08 | (2006.01) |
| C09J 175/04 | (2006.01) |
| C09J 175/08 | (2006.01) |

(52) U.S. Cl.
CPC ..... *C08G 18/6446* (2013.01); *C08G 18/0866* (2013.01); *C08G 18/12* (2013.01); *C08G 18/3846* (2013.01); *C08G 18/3876* (2013.01); *C08G 18/4018* (2013.01); *C08G 18/42* (2013.01); *C08G 18/4845* (2013.01); *C08G 18/6666* (2013.01); *C08G 18/755* (2013.01); *C09D 175/04* (2013.01); *C09D 175/08* (2013.01); *C09J 175/04* (2013.01); *C09J 175/08* (2013.01)

(58) Field of Classification Search
CPC .. C08G 18/6446; C08G 18/755; C08G 18/12; C08G 18/3876; C08G 18/4018; C08G 18/0866; C08G 18/3846; C08G 18/42; C08G 18/4845; C08G 18/6666; C09D 175/04; C09D 175/08; C09J 175/04; C09J 175/08
See application file for complete search history.

(56) References Cited

U.S. PATENT DOCUMENTS

| | | |
|---|---|---|
| 6,794,445 B2 | 9/2004 | Reusmann et al. |
| 2007/0004896 A1 | 1/2007 | Ito et al. |
| 2011/0311833 A1 | 12/2011 | Parker et al. |

FOREIGN PATENT DOCUMENTS

WO 2005070998 A1 8/2005

OTHER PUBLICATIONS

International Search Report for International PCT Patent Application No. PCT/EP2016/053804 dated May 10, 2016.

*Primary Examiner* — Patrick D Niland
(74) *Attorney, Agent, or Firm* — James E. Piotrowski

(57) ABSTRACT

The present invention relates to aqueous peptide-functionalized polyurethane dispersions that can be used as adhesives, in particular for metal surfaces, such as steel surfaces. As hybrid materials, they provide for a versatile system that can be finely tuned and combine the advantageous properties of polyurethane and peptide materials. Also encompassed are processes for their production, compositions containing them and their use as coatings and adhesives.

19 Claims, 6 Drawing Sheets

AQUEOUS PEPTIDE-FUNCTIONALIZED POLYURETHANE DISPERSIONS

The present invention relates to aqueous peptide-functionalized polyurethane dispersions that can be used as adhesives, in particular for metal surfaces, such as steel surfaces. As hybrid materials, they provide for a versatile system that can be finely tuned and combine the advantageous properties of polyurethane and peptide materials. Also encompassed are processes for their production, compositions containing them and their use as coatings and adhesives.

The synthesis of peptide-polymer conjugates has sparked immense interest among researchers in many fields, including biomedicine, personal care, adhesives, etc., for many years. Peptides offer unique properties unattainable with synthetic polymers such as selective and specific interactions with other biomolecules, a highly defined hierarchical structure, as well as responsiveness to various external stimuli. Synthetic polymers, on the other hand, possess a high resistance to degradation and often bring to the table very interesting thermo mechanical properties in films such as elasticity, glass transition, crystallinity, strength, etc. in order to combine the respective advantages of both natural and synthetic polymers, much effort has been directed towards the purification or laboratory synthesis of peptides and proteins, the synthesis of synthetic polymers with the desired properties, and the development of different coupling strategies of both natural and synthetic polymers.

A wide variety of peptides, ranging from large proteins like bovine serum albumin (BSA) to smaller peptides with distinct properties to single amino acids have been used for coupling, demonstrating the far reach of this field. Among the sought-out, unique properties of peptides, their adhesion to particular substrates is a topic which especially interests' scientists. Due to the sequence-defined peptide structure, most often accompanied by strict monodispersity, peptide-substrate interactions are specific and can therefore be modified at will. Whereas for synthetic polymers, unspecific interactions like hydrogen bonds or charge interactions often determine their adhesive behavior, peptide adhesion is often modulated through single amino acid side chains (their degree of oxidation, their orientation in space, etc.); factors which can change dramatically due to minor modifications in the environment. This characteristic renders peptides particularly well-suited for playing the role of a functional component of polymers, bestowing upon them stimuli-responsive, or even reversible adhesion to a particular substrate.

Concerning the synthetic polymer counterpart, initial efforts concentrated largely on water-soluble polymers like polyethylene glycol (PEG). However, subsequent investigations of peptide-functionalized nanoparticles and nanocapsules extended the scope to water-insoluble polymers and inorganic matter and their respective properties. For instance, metal-incorporating particles can be used as contrast agents for magnetic resonance imaging and drug-loaded particles may be used for targeted drug delivery. These uses illustrate the traditional areas of application of peptide-polymer conjugates. Nevertheless, polymer-peptide hybrids are also gaining importance in other fields of application like coatings and adhesives, where polymer backbones other than PEG may be desirable.

One versatile class of polymers which is often used in those fields consists of polyurethanes (PUs). PUs are variable in structure, they may incorporate crystalline domains, charged moieties or water-swellable segments, conferring properties like heat-activation, charge interactions and dispersibility in water. Of particular interest are waterborne polyurethane dispersions (PUDs). PUDs can be synthesized from a wide variety of polyols by reacting them with polyisocyanates to yield water-dispersible polymers with very interesting properties in the films formed thereof, such as partial crystallinity, elasticity, and high modulus. The first step in the synthesis most often consists of a polyaddition reaction between the polyols and the polyisocyanate monomers to form a PU prepolymer. Commonly, polyols with charged groups and with water-swellable moieties are used in order to generate so-called "self-stabilizing" structures, i.e. which can be dispersed in water without the addition of a surfactant. Through addition of a slight excess of isocyanate with regard to alcohol functionalities, a prepolymer of moderate molecular weight with NCO end groups is obtained. These end groups can be used for a chain extension after dispersion to increase the molecular weight of the PU chains and/or for an end cap in order to introduce a desired functionality into the polymer structure.

No matter which combination of natural and synthetic polymers is chosen, a primary concern is obviously preserving the activity of the peptide component which is often sensitive to heat, oxidation, and degradation in general. Two routes have been investigated for peptide-polymer hybrids which proceed either via coupling of presynthesized natural and synthetic polymers (known as the "grafting-onto" approach) or via an in-situ polymerization, starting from the peptide moiety (known as the "grafting-from" approach). Although the latter method has been used successfully, the possible polymer structures are somewhat limited. In contrast, the main drawback of the grafting-onto method is constituted by unspecific coupling which can greatly affect peptide activity. Up to date, coupling was mostly achieved via lysine residues, several of which are usually present in a peptide chain and a precise control of the attachment site was therefore difficult.

There is therefore need in the art for alternative strategies for the generation of peptide-polymer conjugates, in particular conjugates of peptides and polyurethanes. The present invention meets this need by providing for a process for the facile and versatile synthesis of peptide-functionalized polyurethanes dispersions (PUDs).

The present invention is based on the inventors finding that a specific and precisely controllable coupling can be achieved by using cysteine residues that are present in the peptides for coupling. This increases specificity because free cysteines (which are not engaged in disulfide bridges) are rare in peptides. Cysteines are reactive towards molecules like vinyl sulfones, acrylates, or maleimides, resulting in a Michael addition of the SH function to a C=C double bond to form a chemically stable thioether bond. It has been found that in case of maleimide-functionalized polymers, a precisely controlled pH set between 6.5 and 7.5 allows for a selective addition of cysteines with respect to other nucleophilic side chains. More specifically, the inventors have found that at pH 7.0, the Michael addition of cysteines occurs 1000 times faster than that of amines, whereas at higher pH, the reaction with lysine residues becomes more significant. Consequently, careful control of the reaction conditions (i.e. the pH value) permits to selectively couple cysteine-containing peptides to maleimide-functionalized polymeric particles.

The present invention is based on the finding that maleimide-containing PU particles can be functionalized with a cysteine-containing adhesive peptide to transfer the adhesive behavior of the peptide to stainless steel surfaces onto the PU particles. The PU particles are complex in structure, preferably containing segments, which crystallize upon film formation and/or moieties rendering the particles self-stabilizing in water. A high degree of control over the extent of particle functionalization has been demonstrated and the obtained hybrid particles have been investigated in detail.

In a first aspect, the present invention thus relates to a process for manufacturing a peptide-functionalized polyurethane dispersion (PUD), comprising (1) providing an NCO-terminated polyurethane prepolymer;

(2) reacting said NCO-terminated polyurethane prepolymer with a compound comprising at least one NCO-reactive group and at least one maleimide group, preferably a compound comprising one hydroxyl and at least one maleimide group, to obtain a maleimide-terminated polyurethane prepolymer;

(3) dispersing said maleimide-terminated polyurethane prepolymer into a continuous aqueous phase; and (4) reacting the maleimide-terminated polyurethane prepolymer with one or more peptides, wherein said one or more peptides comprise amino acid side chains reactive with the maleimide group, preferably comprise one or more cysteine residues, thereby forming peptide-functionalized polyurethane particles.

In another aspect, the invention relates to the aqueous peptide-functionalized polyurethane polymer dispersion obtainable according to the process described herein.

Further aspects of the invention relate to compositions, in particular adhesive compositions, which contain the aqueous peptide-functionalized polyurethane polymer dispersion disclosed herein and the use of the aqueous peptide-functionalized polyurethane polymer dispersion in adhesive compositions.

Figure 1:
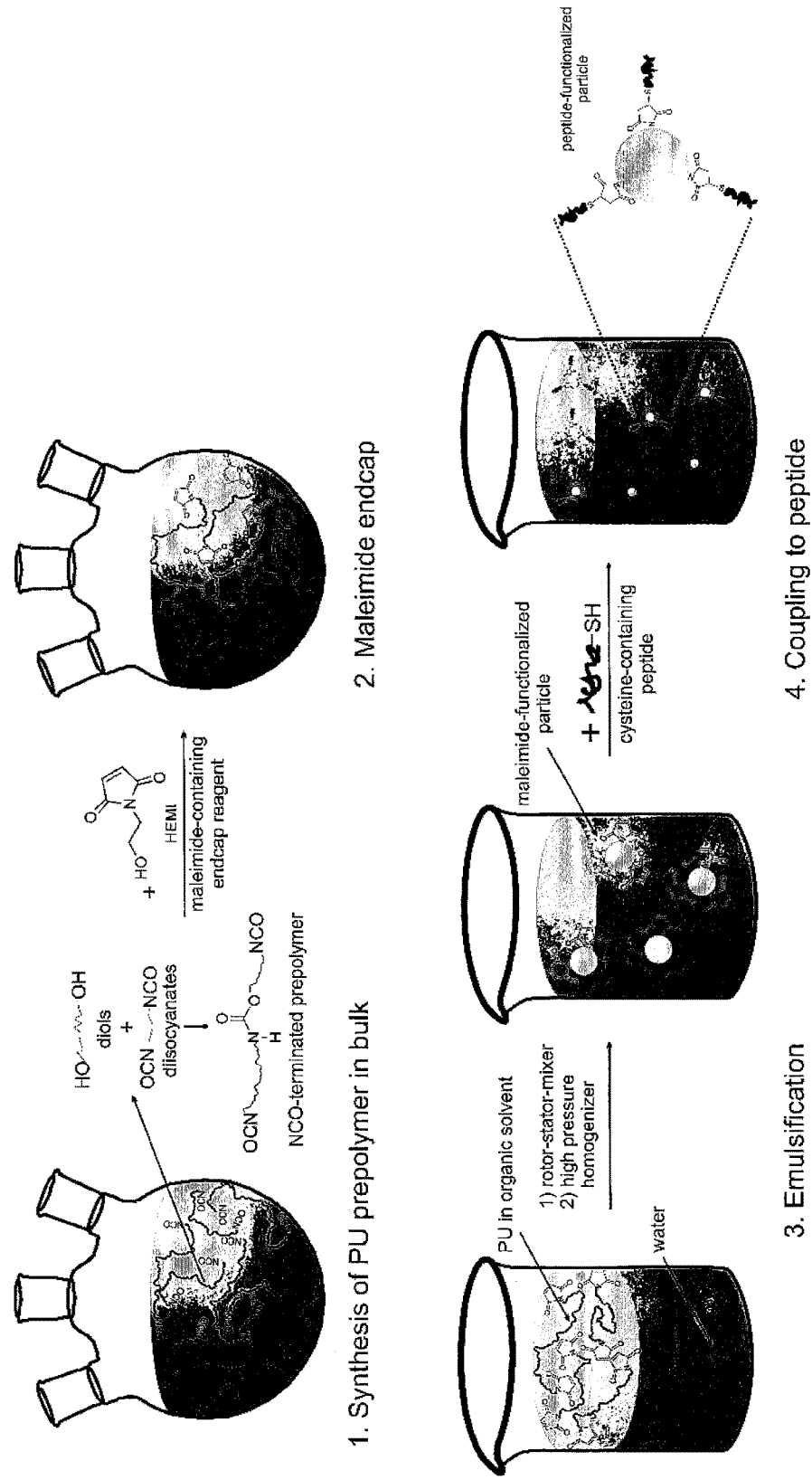
FIG. 1 schematically illustrates the disclosed process.

"One or more", as used herein, relates to at least one and comprises 1, 2, 3, 4, 5, 6, 7, 8, 9 or more of the referenced species. Similarly, "at least one" means one or more, i.e. 1, 2, 3, 4, 5, 6, 7, 8, 9 or more. "At least one", as used herein in relation to any component, refers to the number of chemically different molecules, i.e. to the number of different types of the referenced species, but not to the total number of molecules. For example, "at least one polyol" means that at least one type of molecule falling within the definition for a polyol is used but that also two or more different molecule types falling within this definition can be present, but does not mean that only one molecule of said polyol is present.

The term "peptide", as used herein, refers to a polymer of two or more amino acids that are bound to each other by peptide bonds. The peptides preferably comprise 2 or more amino acids, and are typically of a length of up to 500, preferably up to 200 amino acids. The amino acids of which the peptides are composed are preferably naturally occurring proteinogenic amino acids, such as the 20 amino acids making up naturally occurring proteins. Said amino acids include glycine, alanine, valine, leucine, isoleucine, phenylalanine, cysteine, methionine, proline, serine, threonine, glutamic acid, aspartic acid, asparagine, glutamine, lysine, arginine, histidine, tyrosine, and tryptophan. In various other embodiments, the amino acids making up the peptide can also comprise non-natural amino acids or non-proteinogenic amino acids.

If reference is made herein to a molecular weight of a PU polymer or its components, this reference refers to the average number molecular weight $M_n$, if not explicitly stated otherwise. The number average molecular weight $M_n$ can be calculated based on end group analysis (OH numbers according to DIN 53240) or can be determined by gel permeation chromatography according to DIN 55672-1: 2007-08 with THF as the eluent. If not stated otherwise, all given molecular weights are those determined by end group analysis. The weight average molecular weight $M_w$ can be determined by GPC, as described for $M_n$. The molecular weight of the peptides is determined by gel electrophoresis against a reference marker, in particular polyacrylamide gel electrophoresis (PAGE), or by mass spectrometry.

All percentages given herein in relation to the compositions or formulations relate to weight % relative to the total weight of the respective composition or formula, if not explicitly stated otherwise.

In various embodiments of the invention, step (1) comprises forming an NCO-terminated polyurethane prepolymer from a reaction mixture comprising:

(a) at least one polyol, preferably with a number average molecular weight $M_n$ in the range of 400 g/mol to 10000 g/mol; and (b) at least one polyisocyanate, preferably at least one aliphatic di- and/or triisocyanate, wherein the at least one polyisocyanate is used in molar excess relative to the hydroxy groups of the at least one polyol of the reaction mixture to obtain an NCO-terminated polyurethane prepolymer.

The at least one polyol is in various embodiments a non-functionalized polyol, e.g. contains no functional groups besides the hydroxyl groups. It may be at least one polyester polyol, at least one polyether polyol, or at least one polycarbonate polyol, at least one polysiloxane polyol, at least one (hydrogenated) polybutadiene polyol or, preferably, a mixture of thereof, in particular a mixture of at least one polyether polyol and at least one polyester polyol. Also contemplated are thus mixtures of two or more polyester polyols and/or two or more polyether polyols. If a mixture of polyether and polyester polyols is used, the weight ratio may range from about 10:1 to 1:10, preferably 1:2 to 2:1.

Polyester polyols that are useful in the processes described herein include those that are obtainable by reacting, in a polycondensation reaction, dicarboxylic acids with polyols. The dicarboxylic acids may be aliphatic, cycloaliphatic or aromatic and/or their derivatives such as anhydrides, esters or acid chlorides. Specific examples of these are succinic acid, glutaric acid, adipic acid, pimelic acid, suberic acid, azelaic acid or sebacic acid, phthalic acid, isophthalic acid, trimellitic acid, phthalic acid anhydride, tetrahydrophthalic acid anhydride, glutaric acid anhydride, maleic acid, maleic acid anhydride, fumaric acid, dimeric fatty acid and dimethyl terephthalate. Examples of suitable polyols are monoethylene glycol, 1,2-propanediol, 1,3-propanediol, 1,4-butanediol, 3-methylpentane-1,5-diol, neopentyl glycol (2,2-dimethyl-1,3-propanediol), 1,6-hexanediol, 1,8-otaneglycol cyclohexanedimethanol, 2-methylpropane-1,3-diol, dithyleneglycol, triethyleneglycol, tetraethyleneglycol, polyethyleneglycol, dipropyleneglycol, polypropyleneglycol, polypropyleneglycol, dibutyleneglycol and polybutyleneglycol. Alternatively, they may be obtained by ring-opening polymerization of cyclic esters, preferably ε-caprolactone. Preferred are crystalline/semicrystalline polyols, such as, for example, esters of 1,4-butanediol with adipic acid.

In various embodiments, the polyester polyol has a melting temperature $T_m$>0° C., preferably >40° C. and/or has an average number molecular weight $M_n$ in the range of 400 to 5000, preferably 500 to 3000 g/mol, more preferably 800-2500 g/mol, most preferably 1000 to 2000 g/mol.

The polyether polyol may be a polyalkylene glycol homo- or copolymer, preferably a polypropylene glycol homo- or copolymer, a polyethylene glycol homo- or copolymer, a polytetramethylene glycol homo- or copolymer, or a polypropylenglycol/polyethyleneglycol block copolymer.

In various embodiments, the polyether polyol has an average number molecular weight of 1000 to 4000, preferably 1000 to 3000 g/mol.

Suitable polycarbonates can be obtained by reaction of carbon acid derivatives, e.g. diphenyl carbonate, dimethyl carbonate or phosgene with diols. Suitable examples of such diols include ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-pro-panediol, 2,2,4-trimethyl pentanediol-1,3, dipropylene glycol, polypropylene glycols, dibutylene glycol, polybutylene glycols, bisphenol A, tetrabromobisphenol A as well as lactone-modified diols. The diol component preferably contains 40 to 100 wt. % hexanediol, preferably 1,6-hexanediol and/or hexanediol derivatives. More preferably, the diol component includes examples that in addition to terminal OH groups display ether or ester groups.

The hydroxyl polycarbonates should be substantially linear. However, they can optionally be slightly branched by the incorporation of polyfunctional components, in particular low-molecular polyols. Suitable examples include glycerol, trimethylol propane, hexanetriol-1,2,6, butanetriol-1,2,4, trimethylol propane, pentaerythritol, quinitol, mannitol, and sorbitol, methyl glycoside, 1,3,4,6-dianhydrohexites.

Suitable polycarbonate polyols are, without limitation, those obtainable under the trademark names Desmophen® C3200 (Bayer) and Kuraray® C2050 (Poly-(3-methyl-1,5-pentanediol, 1,6-hexanediol)carbonate; Kuraray).

In various embodiments, the reaction mixture includes:
(a) at least one crystalline or semicrystalline polyol, preferably polyester polyol or polycarbonate, with a number average molecular weight $M_n$ in the range of 400 g/mol to 5000 g/mol, a crystallinity of at least 50% and a melting temperature $T_m$ in the range of 40° C. to 80° C., the crystallinity and the melting temperature as determined by differential scanning calorimetry (DSC) according to ISO 11357; and (b) optionally at least one amorphous polyol, preferably polyether polyol, such as polypropylene glycol or poly THF, with a number average molecular weight $M_n$ in the range of 400 g/mol to 5000 g/mol, a crystallinity of less than 10% and a glass transition temperature $T_g$ in the range of –120° C. to 40° C., preferably –70° C. to 30° C., the crystallinity and the glass transition temperature as determined by differential scanning calorimetry (DSC) according to ISO 11357.

The amorphous polyols that can be used in accordance with the embodiments described herein are preferably polyester polyols and/or have a number average molecular weight $M_n$ in the range of 400 g/mol to 5000 g/mol, preferably 500 to 3000 g/mol, more preferably 800-2500 g/mol, most preferably 1000 to 2000 g/mol. "Amorphous", as used herein in relation to the polyols, means that the polyol has a crystallinity of less than 10%, preferably less than 5%, more preferably less than 2%, as determined by differential scanning calorimetry (DSC) according to ISO 11357. The amorphous (polyester) polyols furthermore have a glass transition temperature $T_g$ in the range of –120° C. to 40° C., preferably –70° C. to 30° C., again as determined by differential scanning calorimetry (DSC) according to ISO 11357. Below the glass transition temperature, amorphous polymers are brittle and rigid. This property is due to the immobility of the "frozen" polymer chains. When the glass transition temperature is exceeded the molecular chains become movable relative to one another and the polymer softens, the degree of softening depending on the type of the polymer, the molecular weight of the polymer and the temperature. Amorphous polymers, as compared with (semi-)crystalline polymers, show only a glass stage in the DSC measurement according to ISO 11357 during the transition from the brittle, rigid state to the softened state. A melt peak indicating a semi-crystallinity of the polymer does not occur in the DSC measurements.

The crystalline or semicrystalline polyol is preferably a polyester polyol or polycarbonate and may have a number average molecular weight $M_n$ in the range of 400 g/mol to 5000 g/mol, preferably 500 to 3000 g/mol, more preferably 800-2500 g/mol, most preferably 1000 to 2000 g/mol. "Crystalline", as used herein in relation to the (polyester) polyols, relates to a crystallinity of at least 90%, preferably at least 95%, as determined by differential scanning calorimetry (DSC) according to ISO 11357. Similarly, "semicrystalline", as used herein in relation to the (polyester) polyols, means that they have a crystallinity of at least 50%, preferably at least 70%, but less than 90%. Semicrystalline (polyester) polyols thus comprise crystalline and non-crystalline, i.e. amorphous, regions.

The crystalline and semicrystalline (polyester) polyols useful in the described mixtures may have a melting temperature $T_m$ in the range of 40° C. to 80° C., preferably 40 to 60° C., again as determined by differential scanning calorimetry (DSC) according to ISO 11357.

In embodiments, where a combination of amorphous polyols (b), preferably polyether polyols, and crystalline/semicrystalline polyols (a), preferably polyester polyols or polycarbonates, is used, the molar ratio of the polyol (a) to the polyol (b) may be in the range of 1:4 to 10:1, preferably 1:3 to 5:1, more preferably 1:2 to 2:1.

The reaction mixture may comprise further polyols, in particular diols. Such diols may be monomeric diols, such as 1,4-butanediol.

The reaction mixture may further comprise polyols that are hydroxy-functionalized polymers, for example hydroxy-functionalized siloxanes. Exemplary siloxanes that may be used are hydroxy-functionalized polydimethylsiloxanes, in particular in liquid form, such as those commercially available under the name Tegomer® H-Si 2311 (Evonik, Germany) having a molecular weight Mn of about 2200 g/mol. In various embodiments, these are combined with the semi-crystalline/crystalline polyester polyols described above and/or may be used in addition or instead of the amorphous polyols described above. Suitable polydimethylsiloxane (PDMS) polyols are described in U.S. Pat. No. 6,794,445 B2, for example. They may be used in amounts of up to 60 wt.-% based on the total weight of the polyols used and typically have low $T_g$ values, for example in the range of from −150 to −100° C.

The reaction mixture may further comprise at least one stabilizer.

The term "stabilizer", as used herein, relates to a class of molecules that can stabilize the hydrophobic droplets in a water-based (oil-in-water, abbreviated as o/w) dispersion or emulsion, i.e. prevent coagulation or coalescence. The stabilizer molecules may bind to, adhere to or associate with the droplet surface. The peptides may act as additional the stabilizer molecules. The term "stabilizer", as used herein, furthermore relates to molecules that have a HLB value>10, preferably >12 and more preferably >15 according to Griffin and/or a water solubility of >10 g/L, preferably >50 g/L, more preferably >100 g/L and most preferably >150 g/L. Furthermore, species which are able to carry an electric charge in water in a pH regime between pH3 (±1) to pH 11 (±1) are considered as stabilizers. Examples are molecules containing an anionic or latent anionic moiety, e.g. sulfate, sulfonate, phosphate, phosphonate or carboxylic groups without being limited to these. Additionally, molecules containing cationic or latent cationic groups, like quaternary or tertiary amine groups, without being limited to these, are also "stabilizers" in the sense of the present invention.

The term "colloidal stability", as used herein, relates to emulsions or dispersions which do not change their average particle size by more 100%, preferably not more than 50%, more preferably not more than 25% and most preferably not more than 10% over 28 day of storage. The storage conditions are room temperature without agitation and without direct light exposure and at a solid content of at least 5%, preferably at least 10%, more preferably at least 20% and most preferably more than 30% by weight. The pH and the ionic strength shall remain unchanged after emulsification and no other components, especially no surface active components for stabilization, no rheology agents or solvents shall be added. However, if necessary as only exemption a biocide agent might be added upon storage in concentrations of up to 0.5% (e.g. Acticide MBS by the Thor company). For the particle size determination laser diffraction (LD) measurements as described in manuscript below can be applied. Alternatively, Dynamic Light. Scattering (DLS) can be used, as defined by the z-average according to ISO 22412:2008, when the starting particle size is below 500 nm.

Generally, stabilizer molecules as known in the prior art comprise a hydrophilic and a hydrophobic part, with the hydrophobic part interacting with the droplet and the hydrophilic part be exposed to the solvent. Commonly used stabilizers are surfactants and may bear an electric charge, for example may be anionic surfactants or cationic surfactants, or, alternatively, may be non-ionic.

However, to avoid the use of external surfactants and due to the increased stability provided, recently reactive stabilizer compounds that are built into the polyurethane polymer during (pre)polymer formation have become more popular, as these provide for (self-)emulsifiable polyurethanes which under agitation, e.g. high sheer emulsification, or spontaneously form stable dispersions in water without the assistance of external emulsifiers.

These reactive stabilizers comprise or consist of isocyanate-reactive functionalities in order to become incorporated in the polyurethane structure. Preferred species are polyols, most preferably diols, or a mixture of different polyols and/or diols. Non-ionic polymeric stabilizers are known, with an average molecular weight $M_n$ of about 4000 g/mol, preferably up to about 3000 g/mol, more preferably up to about 1000 g/mol. Suitable non-ionic ethylene glycol/propylene glycol stabilizers are for example those commercially available under the trademark name Pluronic® from BASF, for example Pluronic PE3500. The non-ionic stabilizers may, in various embodiments, have HLB (hydrophile lipophile balance) values between 6 and 20, preferably >10. The HLB values are calculated by calculating the hydrophilic portion of the molecule by dividing the molecular weight of the hydrophilic part of the molecule, such as the alkylene oxide, by the total molecular weight of the molecule and then dividing the obtained percentage by 5.

While the afore-mentioned stabilizers are non-ionic, they may be modified by anionic or cationic groups. The presence of such charged groups may increase the stability of the dispersed polymer droplets or particles. Suitable anionic groups include, but are not limited to acidic groups, such as carboxylic acid or sulfonic acid groups and their respective salts. Concrete compounds suitable as anionic stabilizers in the sense of the present invention are 2,2-bis(hydroxymethyl)propionic acid (dimethylol propionic acid; DMPA) and sulfonated polydiols with a molecular weight $M_w$ in the range of up to 1000 g/mol, preferably up to 500 g/mol. Such sulfonated polydiols, for example propoxylated 1-methyl-2-methylol-3-hydroxy-1-propanesulfonate with a molecular weight $M_w$ of about 430 g/mol, are commercially available under the name GS-7Q (Yedang G & Co. Ltd).

Suitable cationic groups include, but are not limited to ammonium groups, in particular quaternary ammonium groups. Particularly preferred are alkoxylated, preferably ethoxylated or propoxylated, dialkylammonium diols, such as ethoxylated cocoalkylmethyl ammonium methanesulfonate. Such compounds are commercially available under the trademark name Rewoquat® CPEM from Evonik.

The term "reaction mixture", as used herein, relates to the mixture of the polyols and the polyisocyanate(s). "Polyol mixture", as used herein in relation to the mixture comprising the polyols, relates to a mixture comprising the at least one polyol and, optionally, any additional polyols, including polyhydroxy-modified polymers of various types, that may be present.

It is preferred that the polyol mixture does not contain any organic solvents or surfactants and no further additives, i.e. consists only of the polyols, preferably those defined above.

In various embodiments, the polyol mixture comprises about 20 to about 100 wt.-%, preferably 30 to 100 wt.-%, of the at least one polyol, preferably a mixture of different polyols, for example of polyester polyols and polyether polyols, relative to the weight of the polyol mixture. If present, the stabilizer is usually contained in amounts of about 1 to 30 wt.-%, preferably 10 to 20 wt.-%, relative to the weight of the polyol mixture.

The other reactant employed in the formation of the polyurethane prepolymer is a polyisocyanate. Any compound which includes at least two isocyanate groups is within the contemplation of the present invention. It is preferable, however, that the polyisocyanate be a diisocyanate. The incorporation of small amounts of isocyanate with a functionality higher than two, in particular a triisocyanate, is also contemplated and may under certain circumstances even be advantageous. Such polyisocyanates can act as cross-linkers. In this case where the polyisocyanate acts as a cross-linker, polyisocyanates based on hexamethylene diisocyanate are preferred. Suitable diisocyanates include, without limitation, methylenediphenyl diisocyanate (MDI), toluene-2,4-diisocyanate (TDI), hexamethylene diisocyanate (HDI), polymeric diphenylmethane diisocyanate (PMDI), isophorone diisocyanate (IPDI), methylene-4,4-bis (cyclohexyl)diisocyanate (H12MDI) and mixtures thereof. Although both aliphatic and aromatic polyisocyanates are within the contemplation of the present invention, it is preferred that the polyisocyanate be an aliphatic polyisocyanate. Thus, in a particularly preferred embodiment, the polyisocyanate is an aliphatic diisocyanate. Among particularly preferred aliphatic diisocyanates are isophorone diisocyanate, hexamethylene diisocyanate, and mixtures thereof. Suitable polyisocyanates are, for example, commercially available under the trademark name Desmodur® from Bayer AG (DE). The polyisocyanate is used in molar excess relative to the OH groups of all polyols present in the reaction mixture, the OH/NCO equivalent ratio preferably being 1:1.1 to 1:4, more preferably 1:1.2 to 1:1.3. The amount of the at least one polyisocyanate in the reaction mixture is typically in the range of 10 to 20 wt.-% relative to the reaction mixture. The remainder of the reaction mixture may be made up by the polyol mixture, as defined above.

Providing the polyol mixture may include the step of mixing the polyols and heating the mixture. The heating may be required in case the polyols employed are solid at room temperature and need to be melted to form the polyol mixture. In preferred embodiments, the polyols are combined and heated to about 70 to 95° C., for example about 75° C., while stirring the mixture under vacuum to dry. After the mixing, the mixture may be cooled to 60° C. for the addition of the isocyanates.

The polyol mixture is subsequently combined with at least one polyisocyanate in the reaction mixture to form the prepolymer. The prepolymer reaction usually occurs at elevated temperature, preferably in the range of between about 70° C. and about 95° C., more preferably about 80° C., over a period of between about 1 and about 24 hours. The reaction is typically carried out in the presence of a catalyst that is added, preferably a tin-, bismuth- or zinc-based catalyst, more preferably dimethyldineodecanoatetin, for example commercially available under the trade name Fomrez UL28 (Momentive Performance Materials GmbH, Germany). Alternative catalysts of high reactivity are Bismuth-neodecanoate and Zn-Neodecanoat available under the trade names BorchiKat 315 and BorchiKat 0761 (OMG Borchers GmbH, Germany). In preferred embodiments of the invention, the reaction mixture thus further comprises a catalyst as defined above.

The reaction continues until the free isocyanate content reaches or comes very close to the calculated value, as determined by standard titration with dibutylamine. Preferred values for the free isocyanate content in the prepolymer are in the range between 0.2 and 3 wt.-%, preferably 1 to 2 wt.-% relative to the total amount of polyols, including the stabilizer(s), and polyisocyanate in the mixture.

"About", as used herein, relates to ±10%, preferably ±5% of the numerical value to which it refers. "About 70° C." thus relates to 70±7, preferably 70±3.5° C.

As described above, in the polyurethane prepolymer-forming reaction the polyisocyanate is reacted in a concentration in excess of the stoichiometric concentration required to completely react with the hydroxyl groups. The excess used may include an OH/NCO equivalent ratio of 1:1.1 to 1:4. Preferably, the amount of the polyisocyanate is 20% to 150% in excess of the stoichiometric concentration required to completely react with the hydroxyl groups.

In various embodiments, step (2) is carried out by adding the compound comprising at least one, preferably only one, NCO-reactive group, such as a hydroxyl group, and at least one maleimide group to the formed prepolymer once the desired NCO content has been reached. The addition is preferably done without further purification of the prepolymer. The reaction temperature can be maintained in the range given above for the prepolymer forming reaction. The compound comprising a hydroxyl and at least one maleimide group is preferably an N-hydroxyalkyl maleimide, such as, for example and without limitation, N-(2-hydroxyethyl) maleimide. In some embodiments, in the maleimide capping reaction, the prepolymer is reacted with a concentration of the maleimide compound that is in excess of the stoichiometric concentration required to completely react with the isocyanate (NCO) groups of the prepolymer. The excess may be a molar excess and may include an NCO/maleimide equivalent ratio of 1:1.1 to 1:4. Preferably about 1:2.5. Preferably, the amount of the maleimide groups is 20% to 150% in excess of the stoichiometric concentration required to completely react with the NCO groups. In such embodiments, a fully maleimide-endcapped prepolymer can be obtained. In various other embodiments, the concentration of the maleimide compound is lower than the stoichiometric concentration required to completely react with the NCO groups of the prepolymer.

The successful encapping of the prepolymer by maleimide groups can be monitored by Infrared spectroscopy (IR).

Subsequently, the formed maleimide-terminated prepolymer may be dissolved in a suitable organic solvent, including, without limitation, ethyl acetate or acetone. The organic solvent is preferably water-immiscible.

In various embodiments, the maleimide-terminated prepolymer has an average number molecular weight $M_n$ of 2500 to 20000, preferably 3000 to 12000 g/mol, more preferably 4000 to 6000 g/mol.

In various embodiments, the prepolymer comprises crystalline segments, e.g. has a crystallinity of at least 20% or more, preferably at least 50%, more preferably at least 70%. The crystallinity can be determined as described above, e.g. by differential scanning calorimetry (DSC) according to ISO 11357. In case the crystallinity is determined, it is preferred to use the prepolymers of low molecular weight before emulsification and/or chain extension. For this purpose, the prepolymers may be completely endcapped with a suitable end-capping agent, e.g. dibutylamine. The results for crystallinity can be compared with the literature values for the polyols used, or, more preferably, validated by x-ray measurements. Because the degree of semi-crystallinity for a given polymer is depending on the thermal history, the polymeric and semicrystalline materials should be staged for at least 24 hours, preferably a week, at a temperature of five Kelvin below the respective melting temperature as defined via DSC according to ISO 11357.

In various embodiments and if necessary, the prepolymer may be neutralized at this stage by using a suitable neutralization agent. Typically, this is only necessary if an ionic stabilizer is used. For example, in case an anionic acidic stabilizer is used, an amine base, such as triethylamine may be used for neutralization.

The thus formed prepolymer is then dispersed in a continuous aqueous phase. The aqueous phase preferably contains as a solvent predominantly (>50 vol.-%, preferably >80 vol.-%, more preferably >90 vol.-%) or exclusively (i.e. 100 vol.-%) water, i.e. contains no other liquid solvent. The aqueous phase may however further comprise solutes, for example salts and buffer substances, but is preferably water essentially without any other solvents or solutes.

The dispersion may be achieved under vigorous agitation. In various embodiments, the prepolymer is used in form of a solution of the prepolymer in an organic solvent, with the solution then being emulsified in water. The dispersing step may be carried out at elevated temperature, for example in the range of about 30 to 60° C., for example at about 40° C. The dispersing step may be done by mechanical stirring alone or by dispersing devices, such as high-pressure homogenizers, microfluidizers or rotor-stator dispersing machines, such as an ultra-turrax device.

The dispersing step may include emulsifying the polyurethane prepolymer in liquid form into a continuous aqueous phase, preferably water, to form a pre-emulsion; and homogenizing the pre-emulsion to form a stable (mini) emulsion. Homogenization of the pre-emulsion in order to form a miniemulsion may be achieved by the action of a shear force, preferably under application of high shear forces, for example by a high-pressure homogenizer. The homogenizer may have an energy input in the range of from $10^3$ to $10^5$ J per second per liter of the emulsion.

Generally, the dispersing step, preferably the homogenization step, may be carried out with a high shear process. Preferably, a high shear process relates to application of high shear forces, wherein high shear forces is to be understood as to apply (a) shear rates of at least 1.000.000/s, and/or (b) an energy input per time of at least $10^3$ J per second per liter of the emulsion.

For the dispersing step, the prepolymer is preferably used in liquid form, i.e. it is either liquid at room temperature or, if it is solid at room temperature, it is melted or dissolved in a suitable organic solvent, such as, without limitation, acetone or ethyl acetate. If an organic solvent is used, this may be removed later from the dispersion by known means, for example by evaporation using a rotary evaporator. In such solutions of the prepolymer, the prepolymer and organic solvent are preferably used in weight ratios of 2:1 to 1:4, preferably about 1:1.

The term "miniemulsion" or "emulsion", as used herein, relates to oil-in-water (O/W) emulsions, i.e. emulsions in which water is used in excess and is the continuous medium. In the described processes, stable droplets/particles of the PU prepolymer with a maleimide endcap are obtained, which have typically a size between 50 and 500 nm, preferably between 100 and 400 nm. The particles preferably have $10^4$-$10^6$ maleimide groups per particle, more preferably about 2-8×$10^5$ maleimide groups per particle.

The processes of the invention may further comprise a step of separating the maleimide-terminated polyurethane polymer particles from any unreacted compounds. This may for example be achieved by dialysis or any other suitable technique, such as chromatography.

Before step (4) or simultaneously with step (4), the maleimide endcapped prepolymer, in particular those prepolymers that are not completely endcapped, may be further reacted with a suitable chain extension agent or water to react all free NCO groups. To achieve this, a suitable chain extension agent is added to the emulsion of the prepolymer. Suitable chain extension agents are compounds that comprise at least two NCO-reactive groups. "NCO-reactive groups", as used herein, relates to functional groups that are reactive towards isocyanate, i.e. NCO groups, such as hydroxyl groups, amino groups, thiol groups and carboxyl groups. Exemplary chain extension agents include, without limitation, diamines, such as hydrazine, alkylene diamines or cycloalkylene diamines, preferably ethylene diamine, isophorone diamine, piperazine, polyether amine, and diols, such as butane diol or 2-butyl-2-ethyl-1,3-propane diol. Furthermore, small amounts of tri- or higher functional amines can be used to introduce branching and crosslinking and thus increase the heat resistance of the materials. The chain extension can be carried out until total conversion of free isocyanate groups, i.e. until no free NCO groups are detectable. For the chain extension reaction, the presence of a catalyst and/or elevated temperatures may be necessary.

In step (4), the maleimide-terminated prepolymer is contacted with the peptides. For this step, the peptides may be provided in form of an aqueous solution that is then combined with the dispersion of the prepolymer. The aqueous solution of the one or more peptides may comprise other solutes, in particular those needed to stabilize the peptides, such as buffer substances and salts. In various embodiments, the aqueous solution of the peptides is a buffered solution having a pH between 6.5 and 7.5, preferably about 7.0. In various embodiments of the processes, the aqueous solution comprises the one or more peptides in an amount that is in molar excess of the stoichiometric concentration required to completely react with the maleimide groups of the prepolymer. The excess may be a molar excess and may include a maleimide/cysteine equivalent ratio of 1:1.1 to 1:4, preferably about 1:1.5. Preferably, the amount of the cysteine groups is 20% to 70% in excess of the stoichiometric concentration required to completely react with the maleimide groups.

In various embodiments of the process, the pH in step (4) is set to between 6.5 and 7.5, preferably to about 7.0. This is due to the fact that it has been found that in case of maleimide-functionalized polymers, a precisely controlled pH set between 6.5 and 7.5 allows for a selective addition of cysteines with respect to other nucleophilic side chains. More specifically specific, at pH 7.0, the Michael addition of cysteines occurs about 1 000 times faster than that of amines, whereas at higher pH, the reaction with lysine residues becomes more significant. As it is desirable that coupling occurs only via the cysteine residues of the peptides to ensure specificity of the reaction, the pH value is preferably tightly controlled in step (4).

The one or more peptides used can be any type of peptide, but are preferably adhesive peptides. It is preferred that only one type of peptide is used, with said peptide imparting the desired properties to the polymer particles. While all types of adhesive peptides may be used, an exemplary group of peptides that is useful for adhesive applications are the peptides disclosed in international patent publication WO 2014/072313 A1, which is hereby incorporated by reference in its entirety.

The peptides of the invention can be produced chemically by known methods of peptide synthesis, for example by solid-phase synthesis according to Merrifield. In other embodiments, the peptides of the invention can be produced by recombinant methods. Suitable methods for peptide synthesis and production are well-known to those skilled in the art.

Preferred peptides have an average length of between 5 and 500 amino acids, in particular about 10 to 200 amino acids. The peptide may, in various embodiments, be a (linear) multimer of a peptide sequence of 5 to 20 amino acids in length that are either directly or by means of a linker covalently linked in a linear form by peptide bonds. The linker may be a peptide sequence of 1 to 10 amino acids in length, typically comprising or consisting of amino acids with short, neutral, i.e. uncharged, side chains. The side chains may be polar to increase solubility. Preferred amino acids used in the linker sequence include, without limitation, glycine and serine. Accordingly, the peptide linker may have a sequence, such as $(GS)_x$ or $(SG)_x$, with x being 1 to 5.

Further, the peptides according to the invention comprise at least one, preferably only one free cysteine residue. "Free cysteine residue", as used in this context, means that the peptides comprise a cysteine residue in its reduced form, i.e. having a free thiol group, that does not form a cystine bridge with another cysteine residue. The cysteine residue may be located at one of the termini of the peptide, i.e. the C- or N-terminus, or adjacent to one of the termini. "Adjacent", as used in this context, means that the cysteine residue is located within the terminal 20 amino acids, preferably within the terminal 5 amino acids. It is however preferred that the C residue is the N- or C-terminal amino acid.

Peptides naturally have an amino-terminus, i.e. a free —$NH_2$ group, and a carboxy-terminus, i.e. a carboxylic acid or carboxylate group. In addition, depending on the composition of the peptide, the amino acid side chains comprise hydroxyl groups (serine, threonine, tyrosine), carboxylic acid groups (aspartic acid, glutamic acid), amino groups (lysine), guanidine groups (arginine), carbamoyl groups (asparagine, glutamine), or imidazol groups (histidine). In various embodiments, the thiol groups of cysteines specifically react with the maleimide end groups of the prepolymer in a maleimide-thiol click reaction, while the other functional groups of the peptides do not essentially react with the maleimide groups. As explained above, this can be controlled via the pH value at which the reaction occurs.

The reaction is carried out for about 2 to 24 hours, preferably for about 6-8 hours.

In various embodiments, the reaction between the PU prepolymer and the peptides generates PU particles with a peptide corona. "Peptide corona", as used herein, means that the particle is at its surface modified with peptides that covalently bound and thus encase the particle surface in form of a corona. The peptides may adopt a structure such that their hydrophilic parts are exposed to the aqueous solvent while more hydrophobic parts are buried within the peptide fold or facing the PU particle surface.

The processes of the invention may further comprise a step of (5) separating the peptide-functionalized polyurethane polymer particles from the unreacted peptides. This may for example be achieved by dialysis or any other suitable technique, such as chromatography.

"Essentially free" or "essentially without", as used herein, means that the dispersion and/or composition contains less than 5 wt.-% of the given component, preferably less than 2 wt.-%, more preferably less than 1 wt.-%.

The aqueous peptide-functionalized polyurethane dispersion formed preferably has a solid content of 5 to 70 wt.-%, preferably 15 to 60 wt.-%, more preferably 20 to 55% and most preferably 30-50%.

The complete process of the invention is schematically shown in FIG. 1.

As already mentioned above, the peptide-functionalized polyurethane particle dispersions obtainable by the described processes form also part of the present invention.

The aqueous peptide-functionalized polyurethane dispersions may be used in various fields, such as, without limitation, coating and adhesive products and compositions, adhesive applications and corrosion protection. Such compositions can contain further ingredients all of which are well-known in the field. Accordingly, such uses as well as the compositions as such, in particular coating and adhesive compositions, including varnishes, in particular for metal or metal oxide surfaces, are also encompassed by the present invention.

The peptide-functionalized PUDs of the invention can advantageously be used in coatings, paints and varnishes, adhesives or bonding agents for metal or metal oxide surfaces. The present invention therefore also encompasses coatings, varnishes and paints, adhesives or glues for oxide surfaces that contain the peptide-functionalized polyurethane dispersions of the invention.

Alternatively, the aqueous peptide-functionalized polyurethane dispersions may be used in laundry detergents and textile care compositions, as well as in cosmetic products. Examples include textile care compositions, such as for cotton, and hair- and skin-care cosmetic applications.

Another object of the present invention is a multi-layer composite or a coated substrate, comprising compositions which comprise the peptide-functionalized PUDs or compositions containing them, in particular as adhesion promoters between at least two adjacent layers of the composite, or between the coating and the substrate.

Such multilayer composites are used for various purposes, e.g. as packaging material (especially composite films) or self-adhesive products (multi-layer composite of at least carrier and adhesive layer). The multilayer composites comprise at least two, preferably two to five layers, whereby the individual layers may have a thickness of for example 0.01 to 5 mm. The individual layers may have metal or metal oxide surfaces or may comprise metals or metal oxides. The layers can preferably be metal foils or metallized polymeric films. The compositions according to the invention may be applied to one of the adjacent layers, or alternatively can be applied to both layers. After the application, the surfaces may undergo initial drying to at least partially remove the water. Then the two adjacent layers can be connected by conventional methods, for example by lamination.

Substrates are coated for different purposes. Examples include, without limitation, decorative coverings or protective coatings, such as varnishes, or adhesive coatings. While the substrate can in principle be made of any material, it is preferably made of metal, in particular steel, or of metallized natural or synthetic polymers.

The coating may be applied to the substrate by any conventional means, multilayer films and composites may for example be laminated. In particular, the coating can be applied on the substrate surface in form of an aqueous dispersion and then, where appropriate, dried.

In all above described embodiments where adhesive peptides are used, in particular the ones disclosed in WO 2014/072313 A1, the substrate is preferably a metal. Examples include iron, steel, zinc, tin, aluminum, copper or alloys of these metals with each other or with other metals. Preferred are in particular steel, optionally coated with zinc, zinc alloys, aluminum or aluminum alloys, or aluminum or aluminum alloys.

The metals can be in any form, but are preferably metal foils, metal strips or metal plates. The metal may also be a composite material with a metallic surface. For example, it may be a composite of a polymer film and a metal.

It is understood that all embodiments disclosed herein in relation to the processes and methods are similarly applicable to the disclosed dispersions, compositions, and uses, and vice versa.

The following examples are given to illustrate the present invention. Because these examples are given for illustrative purposes only, the invention should not be deemed limited thereto.

Figure 5A:
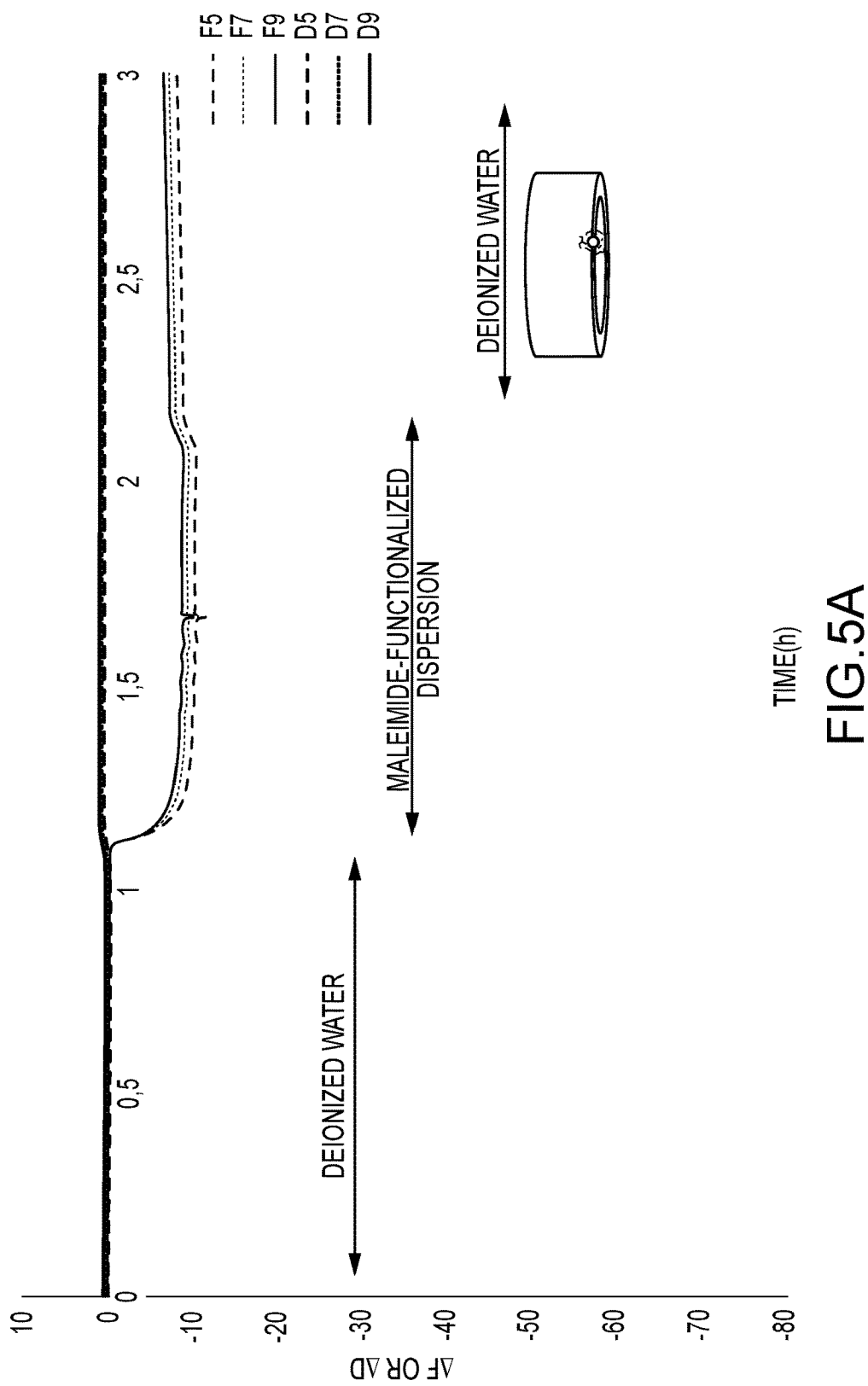
FIG. 5a shows frequency and dissipation changes measured by QCMD performed on stainless steel sensors using a maleimide-functionalized dispersion. Measurements include three phases: 1 h of rinsing with deionized water, then 1 hour of letting the dispersion run over the sensor and lastly another hour of rinsing with deionized water.

FIG. 5a shows that the maleimide-functionalized particles adsorb to a small extent to the stainless-steel surface, resulting in a frequency change of about −12 Hz. Furthermore, the fact that the dissipation does not increase significantly and that the frequency overtones hardly spread indicates that the particles form a rather rigid film on the sensor surface. This observation can be explained by the deposition of single, isolated particles which do not coalesce. The extent of adsorption is too little to allow for a continuous polymer film to form which would show a viscoelastic behavior.

Figure 5B:
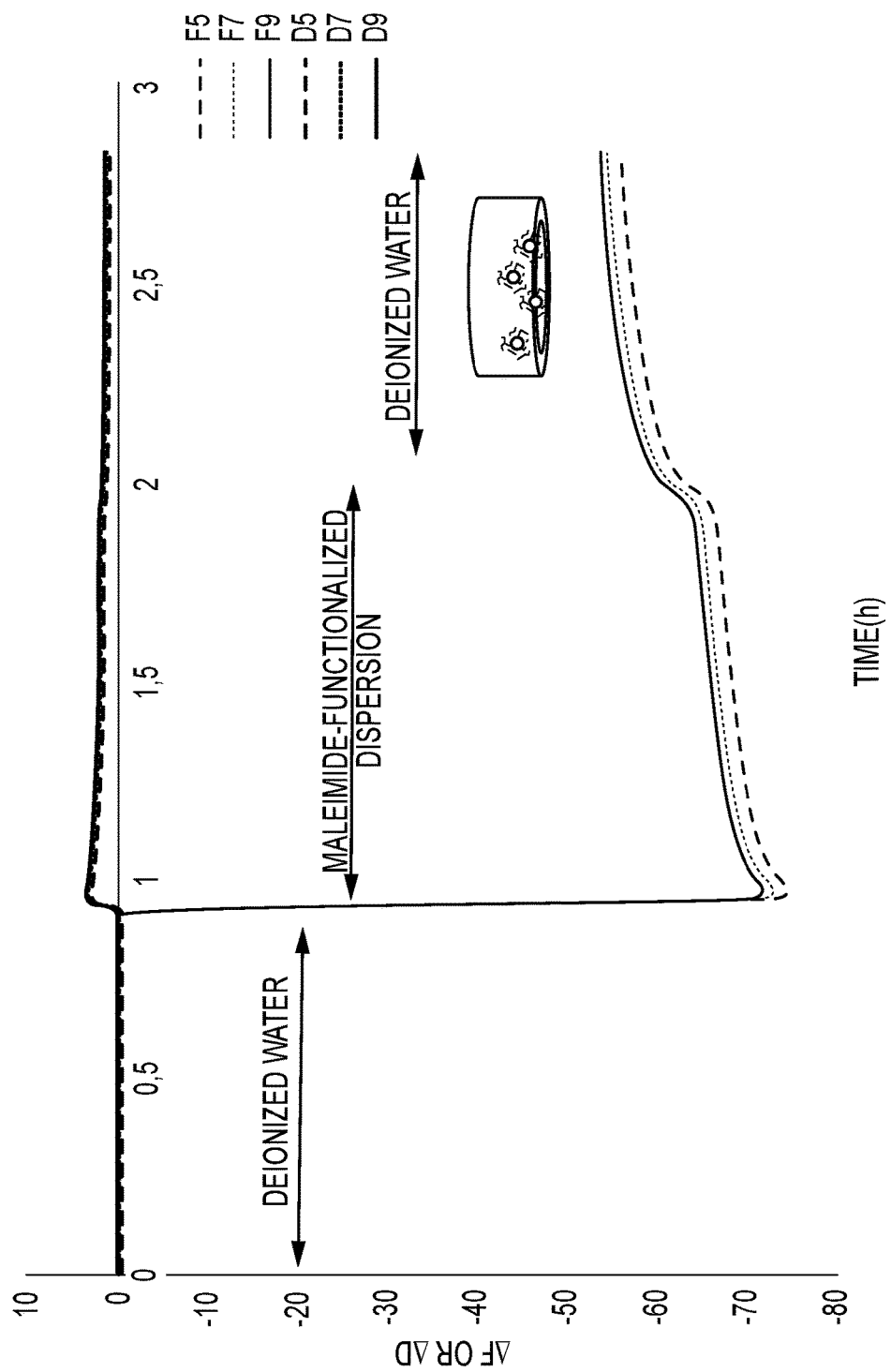
FIG. 5b shows frequency and dissipation changes measured by QCMD performed on stainless steel sensors using a peptide-functionalized dispersion. Measurements include three phases: 1 h of rinsing with deionized water, then 1 hour of letting the dispersion run over the sensor and lastly another hour of rinsing with deionized water.

FIG. 5b on the other hand shows that the peptide-functionalized particles adsorb very well to the stainless-steel surface, leading to a frequency change of about −75 Hz. In addition, after the initial decrease, the frequency change is lessened with ΔF increasing by about 5 Hz. This behavior is characteristic of the adsorption of peptides. When in solution, the latter are surrounded by water molecules which adsorb to the sensor surface alongside the peptides in a first step. Consequently, when the peptide layer condenses, the water molecules are expulsed, leading to a decrease of adsorbed mass and causing the increase in the frequency change observed here. It can therefore be concluded that the adhesion of the peptide-functionalized particles is indeed due to the attached biomolecules.

EXAMPLES

Materials and Methods
Chemicals

The poly(oxypropylene,oxyethylene) glycol (Tergitol L-61, abbreviated here PPOE, M=1948 g/mol) and the poly(oxypropylene,oxyethylene) glycol (K HN 8200, abbreviated here PEOE, M=1941 g/mol) were obtained from Dow Chemical Canada, Inc., Canada. The polyester resin (Realkyd XTR 30110, M=2892 g/mol) was obtained from Arkema Coatings Resins Srl, Italy. The sulfonated Diol (GS-7Q, abbreviated here SOH, M=425 g/mol) was obtained from Yedang G&B Co., Ltd., Chungbuk, Korea. Isophorone diisocyanate (IPDI, M=222.29 g/mol) and 5,5'-Dithiobis(2-nitrobenzoic acid) (DTNB) were obtained from Sigma-Aldrich Chemie GmbH, Germany. The catalyst (Fomrez UL-28) was obtained from Momentive Performance Materials GmbH, Germany. N-(2-hydroxyethyl)maleimide (HEMI, M=141.12 g/mol) was obtained from Chongoing Werlchem Fine Chemical Co. Ltd., San Leandro, Calif., USA and purified by recrystallization from toluene and from chloroform (final purity: 97.7% by quantitative NMR). The inhibitor 4-tert-Butylbenzene-1,2-diol as well as the solvents toluene, chloroform, and acetone were obtained from Sigma-Aldrich Chemie GmbH, Germany. Acetone was dried over molecular sieve. Potassium hydrogen phosphate, potassium dihydrogen phosphate, sodium hydroxide, and hydrochloric acid (2 M solutions) were obtained from Carl Roth GmbH+Co. KG, Karlsruhe, Germany. Tris(hydroxymethyl)-aminomethane (TRIS) was obtained from Millipore S.A.S., Molsheim, France. N-Acetyl-L-cysteine (ACC) and sodium acetate (NaOAc) were obtained from Alfa Aesar GmbH & Co. KG, Karlsruhe, Germany. Unless otherwise specified, chemicals were used as received.

FTIR

FTIR measurements were taken using an Alpha FT-IR Spectrometer from Bruker Optik GmbH, Ettlingen Germany. It was operated in Platinum ATR single reflection diamond ATR module.

UV/Vis Spectroscopy

Absorption measurements at 412 nm were carried out using a Synergy H1 Multi Detection Reader from Bio-tek Instruments GmbH, Bad Friedrichshall, Germany.

QCMD Measurements

For QCMD measurements, stainless steel sensors were obtained from LOT-QuantumDesign GmbH, Darmstadt, Germany. Prior to use, sensors were cleaned by UV/ozone treatment for 10 min, subsequent immersion in an aqueous sodium dodecyl sulfate (SDS) solution (2 wt. %), rinsing with deionized water and drying under nitrogen gas. Two QCMD measurements were carried out by letting first deionized water flow over the sensor for 1 h. Then, the peptide-functionalized dispersion or the maleimide-functionalized dispersion were allowed to flow over the sensor for 1 h, respectively, and lastly, the sensor was rinsed with deionized water for 2 h.

Differential Scanning Calorimetry (DSC)

For DSC experiments, films were made from the peptide-functionalized dispersion before and after dialysis and of the maleimide-functionalized dispersion. The films were stored at 70° C. for 1 h, then at 5° C. for 1 h, and at 45° C. for 3 days in order to permit for melting of crystalline domains, crystal nucleation and growth, respectively.

Example 1: Synthesis of PUDs and Coupling to the Peptide

Synthesis of PU Prepolymer

PPOE (4.00 g; 2.05 mmol), PEOE (4.00 g; 2.06 mmol), polyester resin (35.21 g; 16.63 mmol), and SOH (4.00 g; 9.41 mmol) were heated to 80° C. until molten, then vacuum (pressure<0.1 mbar) was applied for 1 h to remove traces of water. $N_2$ was fed into the flask and the temperature was allowed to drop to 70° C. IPDI (11.66 g; 52.43 mmol) was added. Under nitrogen atmosphere and reflux, 0.01 g of catalyst were added. After the initial increase in temperature, the reaction was carried out at 80° C. The NCO content was checked every half hour using the back titration method until it had reached the theoretical residual value of 1.05% (2 h). Then, HEMI was added (33 wt. % in dried acetone) in excess to react with the remaining NCO groups (molar ration HEMI:NCO was 2.5:1).

Figure 2:
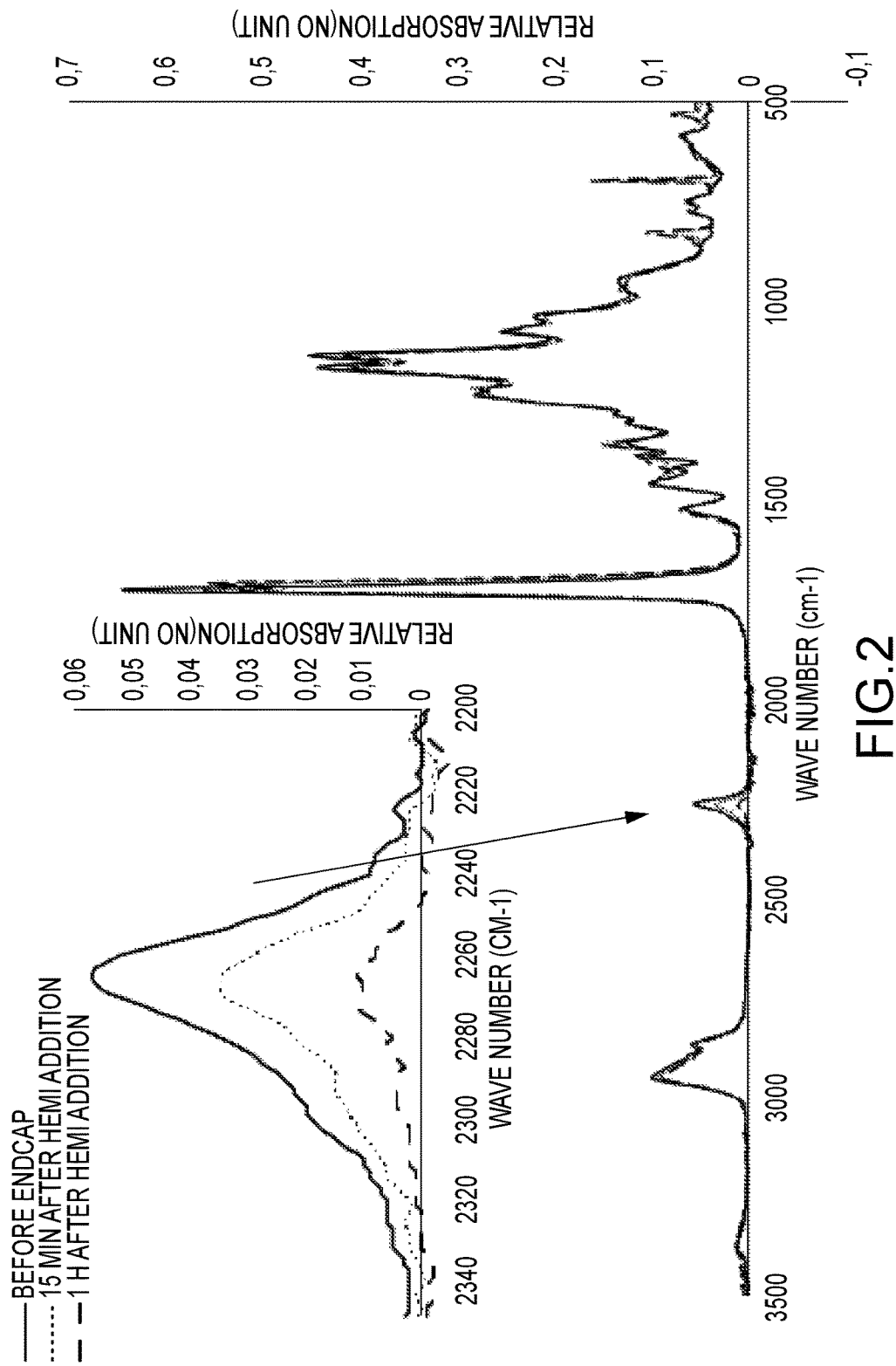
FIG. 2 is an infrared (IR) spectroscopic scan of the reaction. The decrease in the NCO band at 2300 $cm^{-1}$ over time confirms that the reaction takes place and that the PU prepolymer was maleimide-functionalized.

The reaction can be monitored by infrared (IR) spectroscopy and the results thereof are shown in FIG. 2. The decrease in the NCO band at 2300 $cm^{-1}$ confirms that the reaction takes place and that the PU prepolymer was maleimide-functionalized.

Dispersing

Dried acetone (100 g) was added to the prepolymer under vigorous stirring and reflux. 600 g of deionized water were heated to 40° C. A dispersion was formed using an Ultra-Turrax operating at 11 000 rpm for 5 min. Then, the dispersion was passed through a homogenizer containing two chambers of 400 nm and 200 nm diameter and operating at a pressure of 6 bar.

Maleimide-functionalized particles were obtained with an average particle size of 223 nm and a polydispersity index (PdI) of 0.115.

Dialysis

The dispersion was dialyzed for purification to remove the organic solvent and the excess HEMI for three days. The dialysis water was changed every day. The dialysis membrane with a molecular weight cut-off (MWCO) of 100 kDa was obtained from Carl Roth GmbH & Co. KG, Karlsruhe, Germany. After dialysis, the dispersion was freeze-dried for exact solid content measurement (TS: 9.85%). Particle stability and morphology was checked by Dynamic Light Scattering (DLS). After dialysis, it was found that the solid content of the dispersion was 9.85% (measured by freeze-drying), the average particle size was 204 nm and the PdI was 0.125.

Coupling of Cysteine-Containing Peptide to PUD

For coupling, 100 mg (0.0606 mM) of peptide 7C (HMISTMNAASRRGSGC; SEQ ID NO:1) were dissolved in phosphate buffer (0.01 M, pH 7.0) to a concentration of 1.5 mM (corresponding to 40.4 ml of buffer). PUD was added such that the molar ratio of maleimide:cysteine was 1:1.5 (corresponding to 1.70 g of dispersion). The mixture was allowed to stir for 24 h to permit for coupling to occur.

Partial MI De-Functionalization

Using the determined amount of reactive MI in the dispersion, two aliquots were taken and ACC was added in an amount to react with 50% or 75% of MI groups, respectively (corresponding to $2.38 \times 10^{-5}$ mol and $3.57 \times 10^{-5}$ mol). For this, a 10 mM ACC solution was prepared and 2.38 ml and 3.57 ml, respectively, were added to 2.00 g of MI-PUD.

The reaction occurring is a Michael addition of the SH function to a C=C double bond in the maleimides to form a chemically stable thioether bond (see Scheme 1 below).

Scheme 1:

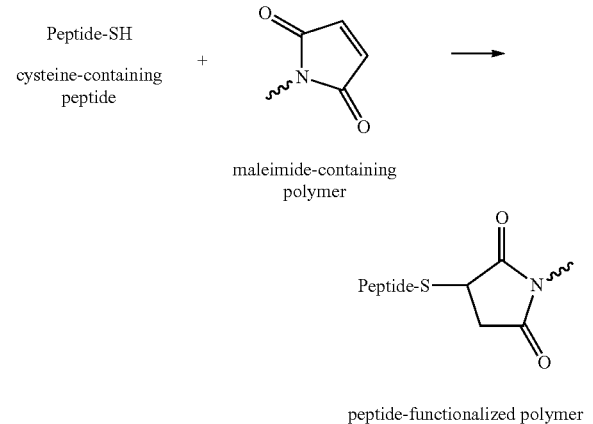

Michael addition between a cysteine-containing peptide and a maleimide-containing polymer to form a stable peptide-polymer conjugate.

Aliquots were taken after 1 h, 3 h, 6 h, 8 h, and 24 h to follow the reaction using the Ellman's Test.

Ellman's Test

A DTNB stock solution was prepared containing 2 mM DTNB and 50 mM NaOAc. Tris buffer was prepared (1 M, pH 8.0), and acetylcysteine solutions of 2.5 mM, 1 mM, 0.5 mM, 0.25 mM, and 0.1 mM) were prepared for calibration. To perform the test, aliquots of 10 µl were taken from the reaction. 50 µl of DTNB stock solution, 100 µl of Tris buffer, and 840 µl of deionized water were added and the solution was incubated for 5 min. Then, three 300 µl fractions were taken and put into a 96-well plate for absorption measurements at 412 nm.

The Ellman's Test has formerly been proven useful to quantify the concentration in solution of a cysteine-containing peptide. The test relies on the reaction between the colorless DTNB and the thiol group of the peptide, producing equimolar quantities of 5-Mercapto-2-nitrobenzoate (MNB) (see Scheme 2). The characteristic absorption of MNB at 412 nm increases linearly with concentration and can therefore be used for quantification of the peptide. The test was used here to follow the reaction between the maleimide-functionalized dispersion and the cysteine-containing peptide. Furthermore, since cysteine residues are susceptible to oxidation in solution, forming unreactive disulfide links, a non-reactive dispersion was also incubated with the peptide to quantify this side-reaction.

Scheme 2: Reaction between DTNB and a cysteine-containing peptide. The reaction product MNB displays a characteristic absorption at 412 nm which allows for the quantification of the peptide sample.

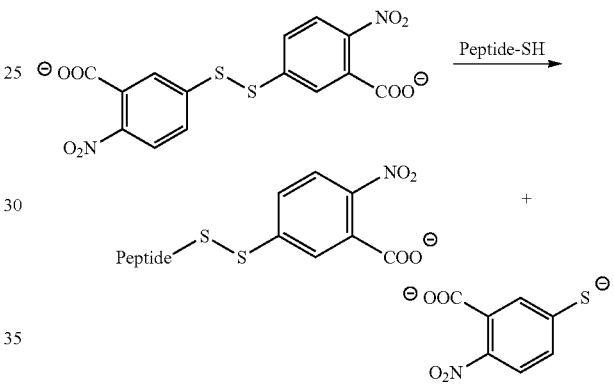

As a first step, the MI-PUD was analyzed with regard to the amount of MI available for reaction: The MI-PUD was incubated with a large excess of ACC (n(MI):n(SH)=1:3) and the Ellman's Test was performed immediately after addition, after 2 h, and after 24 h. It was assumed that the reaction was completed after 24 h. Furthermore, since SH groups are susceptible to oxidation in solution, forming unreactive disulfide links, a non-reactive dispersion (DBA-PUD) was treated in the same way to quantify this side-reaction. The amount of available MI was calculated according to the equation:

$$\% \text{ available } MI = \frac{(n_{ACC \text{ detected for MI-PUD after } 0 \text{ h}} - n_{ACC \text{ detected for MI-PUD after } 24 \text{ h}}) - (n_{ACC \text{ detected for DBA PUD after } 0 \text{ h}} - n_{ACC \text{ detected for DBA-PUD after } 24 \text{ h}})}{n_{\text{theoretical MI groups in dispersion}}} * 100$$

With the theoretical number of MI groups in the dispersion being calculated from the amount of dispersion used, the solid content and the average molecular weight of dually functionalized polymer chains (MW=8282 g/mol), it was calculated that 99% of theoretical MI groups have reacted after 24 h which indicates a successful functionalization, a good stability of the MI groups in the dispersion, and a good accessibility of MI groups for reaction.

Using this information, dispersions were prepared with 50% and 25% functionalization through incubation with the corresponding amounts of ACC. Subsequently, the Ellman's test was used to follow the reaction between the MI-PUDs and the cysteine-containing peptide. A DBA-PUD was again measured in parallel to account for dimerization of the peptide.

Figure 3:
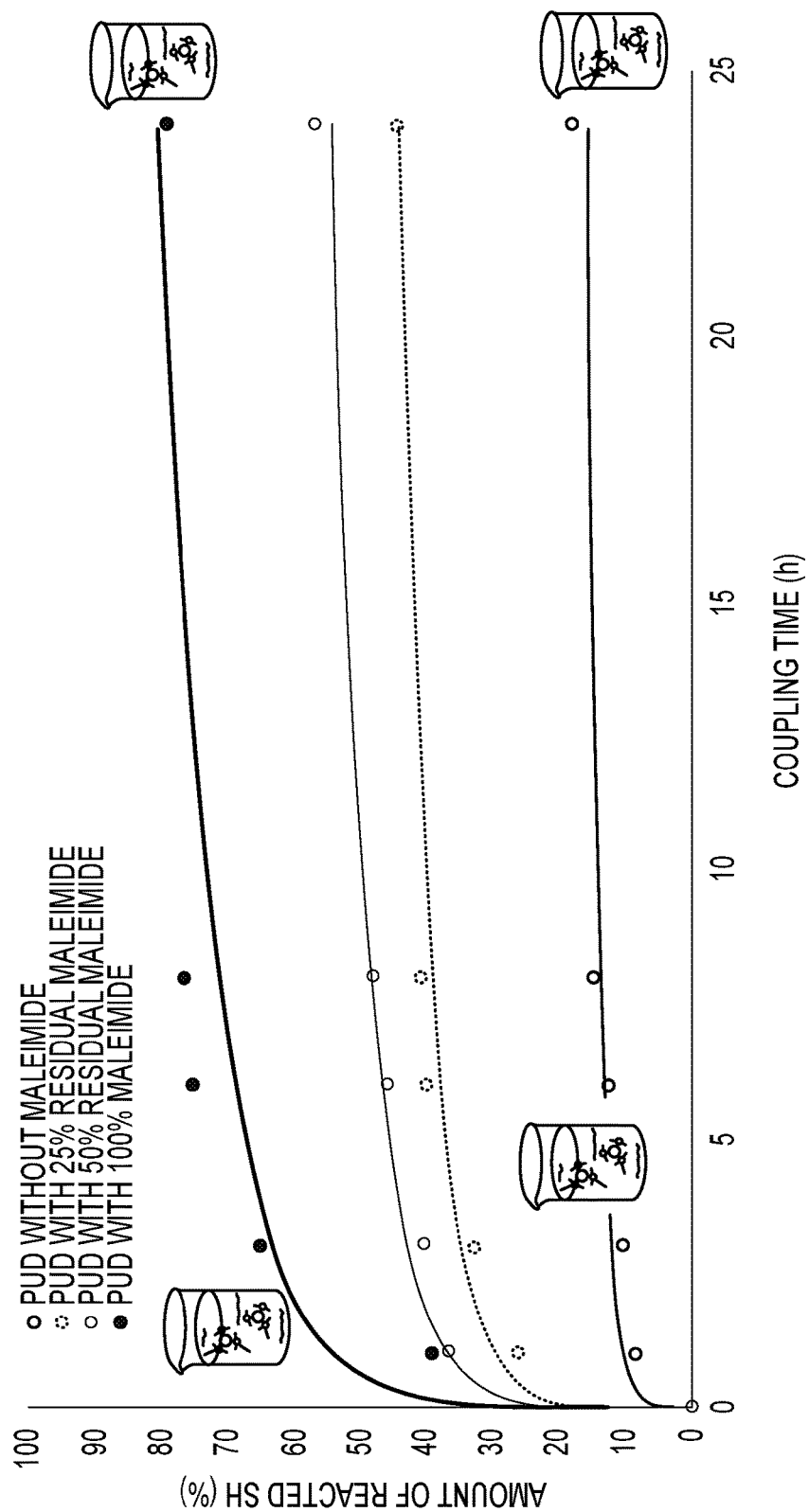
FIG. 3 shows the results of the Ellman's Test performed during incubation of an unreactive and three maleimide-functionalized dispersion with a slight excess (molar ratio 1:1.5) of a cysteine-containing peptide.

FIG. 3 shows the results of the Ellman's Test performed during incubation of an unreactive and three maleimide-functionalized dispersion with a slight excess (molar ratio 1:1.5) of a cysteine-containing peptide. As can be seen in FIG. 3, the oxidation of cysteine accounts for a loss of 20% of the initially added amount of peptide over the course of 24 h. The oxidation is rather fast, seen as 15% have already reacted within the first hour. In comparison to this, when the MI-PUD with 100% MI is present in the peptide solution, the cysteine content decreases about 60% within 24 h. The initial decrease after the first hour is also much greater (about 55%), indicating that coupling predominates over oxidation. It may further be noted that coupling is virtually complete after 6 h with the cysteine content reaching a plateau. The same trends are observed for the two dispersions with intermediate MI-functionalization. In case of the MI-PUD with 100% MI, 40% of the cysteine present in the reaction medium are thus covalently attached to the particles.

DSC

Figure 4:
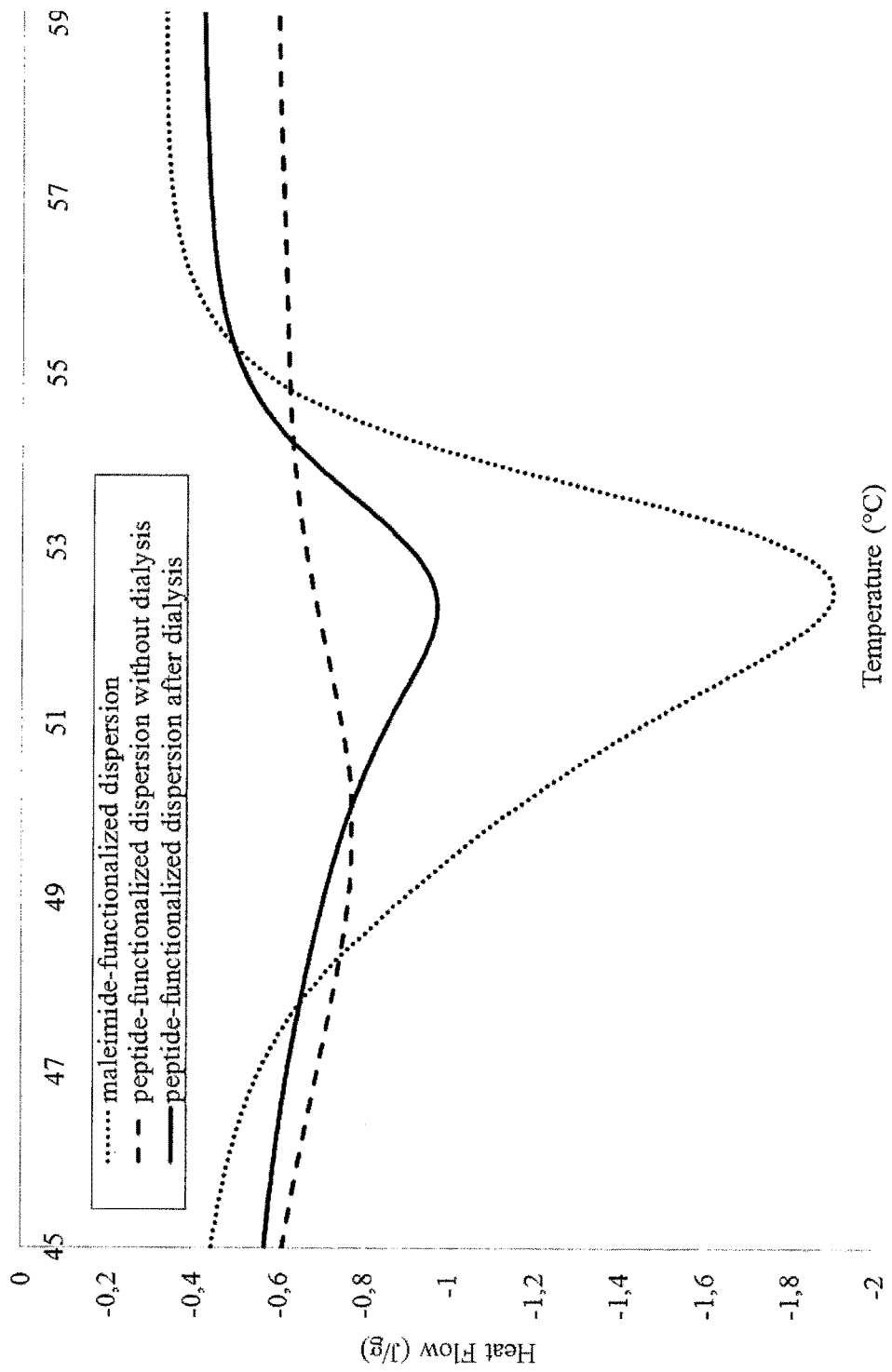
FIG. 4 is a Differential Scanning calorimetry (DSC) test to assess the effect of the peptide functionalization of the film properties.

DSC measurements were conducted in order to assess the effect of the peptide functionalization of the film properties (see FIG. 4). The melting enthalpy for the maleimide-functionalized dispersion, of the peptide-functionalized dispersion before dialysis and of the peptide-functionalized dispersion after dialysis are 99 J/g, 59 J/g and 64 J/g, respectively. Those values indicate that crystallization is greatly affected by the presence of the peptide. Furthermore, the graph indicates the presence of two peaks, one at 49° C. and one around 52° C. corresponding to two types of crystallites formed. The maleimide-functionalized dispersion shows both peaks with a greater proportion of crystallites melting at 52° C. The dialyzed peptide-PUD shows the same behavior. Interestingly, however, for the peptide-PUD which was not dialyzed, the melting peak at 52° C. disappeared completely. This observation indicates that the melting peak at 49° C. corresponds to smaller crystallites and that the presence of large amounts of peptide impedes the formation of larger crystallites from the small ones during tempering, as is observed for the other two samples.

Dialysis

After coupling, the dispersion was dialyzed against deionized water for 7 days for desalting and in order to remove unattached peptide. The dialysis water was changed every day. A dialysis membrane with a molecular weight cut-off (MWCO) of 100 kDa was used.

Example 2: Adhesion to Stainless Steel (SS2343)

In order to investigate if the peptide's adhesive properties have been transferred to the particles, the dispersions were dialyzed to remove any remaining unattached peptide and QCMD measurements on stainless steel (type SS2343) sensors were performed. Results thereof are displayed in FIG. 5, which shows the results thereof in form of frequency and dissipation changes measured by QCMD performed on stainless steel sensors using a maleimide-functionalized dispersion and a peptide-functionalized dispersion (a and b, respectively). Measurements include three phases: 1 h of rinsing with deionized water, then 1 hour of letting the dispersion run over the sensor and lastly another hour of rinsing with deionized water. The graphs show that adsorption is much more pronounced for the peptide-functionalized dispersion than for the reference sample.

FIG. 5a) shows that the maleimide-functionalized particles adsorb to a small extent to the stainless-steel surface, resulting in a frequency change of about −12 Hz. Furthermore, the fact that the dissipation does not increase significantly and that the frequency overtones hardly spread indicates that the particles form a rather rigid film on the sensor surface. This observation can be explained by the deposition of single, isolated particles which do not coalesce. The extent of adsorption is too little to allow for a continuous polymer film to form which would show a viscoelastic behavior.

FIG. 5b) on the other hand shows that the peptide-functionalized particles adsorb very well to the stainless-steel surface, leading to a frequency change of about −75 Hz. In addition, after the initial decrease, the frequency change is lessened with ΔF increasing by about 5 Hz. This behavior is characteristic of the adsorption of peptides. When in solution, the latter are surrounded by water molecules which adsorb to the sensor surface alongside the peptides in a first step. Consequently, when the peptide layer condenses, the water molecules are expelled, leading to a decrease of adsorbed mass and causing the increase in the frequency change observed here. It can therefore be concluded that the adhesion of the peptide-functionalized particles is indeed due to the attached biomolecules.

The invention claimed is:

1. A process for manufacturing a peptide-functionalized polyurethane dispersion (PUD), comprising:
   (1) providing an NCO-terminated polyurethane prepolymer;
   (2) reacting said NCO-terminated polyurethane prepolymer with a compound comprising at least one NCO-reactive group and at least one maleimide group to obtain a maleimide-terminated polyurethane prepolymer;
   (3) dispersing said maleimide-terminated polyurethane prepolymer into a continuous aqueous phase; and
   (4) reacting the maleimide-terminated polyurethane prepolymer with one or more peptides, wherein said one or more peptides comprise amino acid side chains reactive with the maleimide group, thereby forming peptide-functionalized polyurethane particles.

2. The process according to claim 1, wherein the compound comprising at least one NCO-reactive group and at least one maleimide group is a compound comprising one hydroxyl and at least one maleimide group.

3. The process according to claim 1, wherein step (1) comprises forming an NCO-terminated polyurethane prepolymer from a reaction mixture comprising:
   a) at least one polyol with a number average molecular weight $M_n$ in the range of 400 g/mol to 10000 g/mol; and
   b) at least one aliphatic di- and/or triisocyanate, wherein the at least one aliphatic di- and/or triisocyanate is used in molar excess relative to the hydroxy groups of the at least one polyol of the reaction mixture to obtain the NCO-terminated polyurethane prepolymer.

4. The process according to claim 3, wherein the at least one polyol comprises
   a) a polyether polyol; or
   b) a polyester polyol; or
   c) both (a) and (b).

5. The process according to claim 3, wherein the reaction mixture comprises
   a) at least one crystalline or semicrystalline polyester polyol and/or at least one crystalline or semicrystalline polycarbonate polyol, wherein polyol(s) a) has a number average molecular weight $M_n$ in the range of 400 g/mol to 5000 g/mol, a crystallinity of at least 50% and a melting temperature $T_m$ in the range of 40° C. to 80° C., the crystallinity and the melting temperature as determined by differential scanning calorimetry (DSC) according to ISO 11357; and b) optionally at least one amorphous polyether polyol with a number average molecular weight $M_n$ in the range of 400 g/mol to 5000 g/mol, a crystallinity of less than 10% and a glass transition temperature $T_g$ in the range of −120° C. to 40° C., the crystallinity and the glass transition temperature as determined by differential scanning calorimetry (DSC) according to ISO 11357;

wherein the molar ratio of the polyol (a) to the polyol (b) is in the range of 1:4 to 10:1.

6. The process according to claim 3, wherein
1) the at least one aliphatic di- and/or triisocyanate is used in molar excess relative to the hydroxy groups of at least one polyol a), the OH/NCO equivalent ratio being 1:1.1 to 1:4, and/or
2) the at least one diisocyanate or triisocyanate is selected from the group consisting of isophorone diisocyanate (IPDI), hexamethylene diisocyanate (HDI), polymeric polyisocyanates based on IPDI or HDI, and mixtures thereof.

7. The process according to claim 1, wherein the NCO-terminated polyurethane prepolymer:
a) is provided in form of a solution in an organic solvent; and/or
b) has an average number molecular weight $M_n$ of 2500 to 20000; and/or
c) comprises crystalline segments.

8. The process according to claim 1, wherein the compound comprising at least one NCO-reactive group and at least one maleimide group is an N-hydroxylalkyl maleimide.

9. The process according to claim 1, wherein the compound comprising at least one NCO-reactive group and at least one maleimide group is N-(2-hydroxyethyl)maleimide (HEMI).

10. The process according to claim 1, wherein the dispersing step (3) comprises:
a) emulsifying the polyurethane prepolymer into the continuous aqueous phase to form a pre-emulsion; and
b) homogenizing the pre-emulsion to form a stable miniemulsion.

11. The process according to claim 1, wherein the dispersing step (3):
a) is carried out with a high shear process with (i) shear rates of at least 1,000,000/s, and/or (ii) an application of energy per time of at least $10^3$ J per second per liter of the emulsion; and/or
b) comprises dispersing the prepolymer or a solution of the prepolymer into the continuous aqueous phase under application of shear forces to obtain a miniemulsion with droplet sizes of between 50 and 500 nm.

12. The process according to claim 1, wherein the one or more peptides are provided in form of an aqueous solution that is combined with the dispersion formed in step (3).

13. The process according to claim 1, wherein the one or more peptides comprise adhesive peptides.

14. The process according to claim 1, wherein in step (4) the pH is set to between 6.5 and 7.5.

15. An aqueous peptide-functionalized polyurethane dispersion obtained from the process of claim 1.

16. A composition comprising the aqueous peptide-functionalized polyurethane dispersion according to claim 15.

17. An adhesive composition comprising the aqueous peptide-functionalized polyurethane dispersion according to claim 15.

18. A substrate comprising cured reaction products of a composition comprising the aqueous peptide-functionalized polyurethane dispersion according to claim 15.

19. The process according to claim 1, wherein said one or more peptides comprise one or more cysteine residues.

* * * * *